US011303132B2

(12) United States Patent
Falk (10) Patent No.: US 11,303,132 B2
(45) Date of Patent: Apr. 12, 2022

(54) CONVERTER COMPRISING AT LEAST ONE CONVERTER MODULE WITH THREE BRIDGE BRANCHES, OPERATING METHOD, AND USE OF SUCH A CONVERTER

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/906,246

(22) Filed: Jun. 19, 2020

(65) Prior Publication Data

US 2020/0321782 A1    Oct. 8, 2020

Related U.S. Application Data

(63) Continuation of application No. PCT/EP2018/084596, filed on Dec. 12, 2018.

(30) Foreign Application Priority Data

Dec. 21, 2017    (DE) ..................... 10 2017 131 042.8

(51) Int. Cl.
*H02J 3/38*          (2006.01)
*H02J 3/32*          (2006.01)
(Continued)

(52) U.S. Cl.
CPC ................ *H02J 3/381* (2013.01); *H02J 3/32* (2013.01); *H02J 7/35* (2013.01); *H02M 7/487* (2013.01);
(Continued)

(58) Field of Classification Search
CPC ...... H02J 3/381; H02J 3/32; H02J 7/35; H02J 2207/20; H02J 2300/26; H02J 2300/24;
(Continued)

(56) References Cited

U.S. PATENT DOCUMENTS

2006/0279249 A1    12/2006    Rastogi
2007/0217239 A1     9/2007    Rottger
(Continued)

FOREIGN PATENT DOCUMENTS

| DE | 19614627 A1 | 10/1997 |
| DE | 19843110 A1 |  3/2000 |
| EP |  2792061 A2 | 10/2014 |

OTHER PUBLICATIONS

International Search Report dated Mar. 7, 2019 in connection with PCT/EP2018/084596.
(Continued)

*Primary Examiner* — Jared Fureman
*Assistant Examiner* — Aqeel H Bukhari
(74) *Attorney, Agent, or Firm* — Eschweiler & Potashnik, LLC (57)    ABSTRACT

A converter includes an input configured to be connected to a DC source, at least one transducer module coupled to the input, and comprising a first, a second and a third bridge arm, wherein each of the bridge arms respectively has a phase output, and a common DC link circuit coupled to the input and the bridge arms. The first and second bridge arms are configured to provide a first power in the form of alternating current at their respective phase outputs. An energy store is configured to be connected to the phase output of the third bridge arm, and the third bridge arm is configured to exchange a second power between the DC source and the energy store and between the energy store and the DC link circuit/ A control unit is configured to
(Continued)

control the bridge arms in such a manner that the sum of the first power and the second power corresponds to a constant set point.

15 Claims, 4 Drawing Sheets

(51) Int. Cl.
   *H02J 7/35* (2006.01)
   *H02M 7/487* (2007.01)
   *H02M 7/797* (2006.01)
   *H02M 7/5387* (2007.01)

(52) U.S. Cl.
   CPC .......... *H02M 7/5387* (2013.01); *H02M 7/797* (2013.01); *H02J 2207/20* (2020.01); *H02J 2300/26* (2020.01)

(58) Field of Classification Search
   CPC ........ H02J 7/00; H02M 7/487; H02M 7/5387; H02M 7/797; H02M 1/008; H02M 7/53875; H02M 3/156; Y02E 10/56
   See application file for complete search history.

(56) References Cited

U.S. PATENT DOCUMENTS

| | | |
|---|---|---|
| 2010/0090533 A1 | 4/2010 | Shimada |
| 2010/0253304 A1 | 10/2010 | Winkelnkemper |
| 2011/0242867 A1 | 10/2011 | Wang |
| 2011/0304214 A1 | 12/2011 | Haddad |
| 2012/0112702 A1* | 5/2012 | Steigerwald .......... H02J 7/0072 320/137 |
| 2014/0328102 A1* | 11/2014 | Wang ...................... H02J 3/381 363/132 |
| 2015/0022003 A1 | 1/2015 | Dighrasker |
| 2015/0138855 A1 | 5/2015 | Park |
| 2015/0280607 A1 | 10/2015 | Allert |
| 2015/0357909 A1 | 12/2015 | Kobayashi |
| 2017/0366082 A1 | 12/2017 | Liu |
| 2018/0254732 A1* | 9/2018 | Smolenaers .............. H02J 7/02 |

OTHER PUBLICATIONS

Ruxi Wang et al: "A High Power Density Single-Phase PWM Rectifier With Active Ripple Energy Storage", IEEE Transactions On Power Electronics, Bd. 26, No. 5, 1. Mai 2011 (May 1, 2011), Seiten 1430-1443 XP055565501, USA ISSN: 0885-8993, DOI: 10.1109/TPEL.2010.2090670.

* cited by examiner

Fig. 4

CONVERTER COMPRISING AT LEAST ONE CONVERTER MODULE WITH THREE BRIDGE BRANCHES, OPERATING METHOD, AND USE OF SUCH A CONVERTER

CROSS REFERENCE TO RELATED APPLICATIONS

This application is a continuation of International Patent Application number PCT/EP2018/084596, filed on Dec. 12, 2018, which claims priority to German Patent Application number 10 2017 131 042.8, filed on Dec. 21, 2017, and is hereby incorporated by reference in its entirety.

FIELD

The disclosure relates to a converter comprising at least one transducer module with a first, a second and a third bridge arm, wherein each of the bridge arms respectively has a phase output, and wherein a common DC link circuit is provided for all bridge arms. A control unit controls the bridge arms. The disclosure also relates to a method for operating a converter and to a use of such a converter.

BACKGROUND

Converters are often used as inverters in order to transform DC voltage, for example from a photovoltaic (PV) installation, into a grid-compliant alternating current for feeding into a three-phase AC grid. Energy supply grids usually have a three-phase design on all voltage levels, in which case feed-in directives from the grid providers permit only limited power differences for the three phases during feeding. For this reason—apart from converters for special application purposes—converters are often equipped with three bridge arms since this is required for most application purposes.

The document DE 10 2014 104 216 B3 discloses a three-phase inverter which can be operated in single-phase emergency operation if the energy supply grid fails. During this emergency operation, two of the three bridge arms are operated in such a manner that a single-phase alternating current for the emergency supply of a residential building, for example, can be effected on at least one grid phase between these two bridge arms. The third bridge arm remains unused.

EP 2 950 439 A1 discloses a power router consisting of bidirectional power converter subunits connected on the DC side using a DC bus, wherein the power converter subunits supply different loads or feed power into batteries or grids. In this case each of the subunits must be designed for a power corresponding to the respectively connected source or load.

When converting direct current into a three-phase alternating current, energy is drawn from the DC source in a very uniform manner; as a result, the DC link circuit—which may be provided in the form of a film capacitor for example—is only loaded lightly. Only the fluctuation in the constantly drawn DC power, which is often referred to as "ripple" and stems from the switching operations of the semiconductor switches, needs to be buffered here. This does not apply during conversion to a single-phase alternating current; in this case, a power is drawn in sin 2 form and an inverse/out-of-phase power accordingly needs to be compensated for if there is a desire to draw a constant power from the DC source. Therefore, DC link circuits of inverters which are dimensioned for three-phase alternating current usually have too small dimensions for a single-phase application.

For reasons of efficiency, it is desirable to configure and operate converters in such a manner that energy is drawn from the connected PV installation as uniformly as possible over the entire period of the generated alternating current. At the same time, however, there is also a desire to use cost-effective converters which also should have an identical structure as far as possible. Specifically, it would be desirable to upgrade "standard three-phase inverters" which can be favorably produced for applications which go beyond the conventional three-phase alternating current feed into integrated grids. In this context, the connection of storage systems should be mentioned, in particular, since the storage of electrical energy combined with regenerative energy sources is becoming more and more important on account of their greatly fluctuating energy production.

SUMMARY

The present disclosure is directed to a converter comprising a transducer module with three bridge arms which uniformly loads a DC source and provides an AC voltage and a DC voltage for storage systems. A further object is to specify an operating method for such a converter.

In a converter according to the disclosure, an AC voltage power is provided between the phase outputs of the first and second bridge arms, whereas an energy store can be connected to the third bridge arm in order to charge and/or discharge this energy store. A DC source, for example a PV generator, can be connected to the input of the converter. The converter comprises at least one transducer module with a first, a second and a third bridge arm, wherein each of the bridge arms respectively has a phase output. The transducer module also comprises a common DC link circuit for the bridge arms. The first and second bridge arms are configured to draw a first power from the DC source and to provide it as alternating current at the phase outputs. An energy store can be connected to the phase output of the third bridge arm, and the third bridge arm is configured to exchange a second power between the DC source and the energy store and between the energy store and the common DC link circuit. The energy store can draw electrical power from the DC source via the DC link circuit and can store said electrical power, and electrical power can conversely flow from the energy store back into the DC link circuit and can flow on, via the first and second bridge arms, to a grid connected there, for example.

The converter also comprises a control unit which is configured to control the bridge arms, or their semiconductor switches, in such a manner that the sum of the first power and the second power corresponds to a constant set point, with the result that a power flow into or out of the common DC link circuit is minimized. The balancing of the sum of the first power and the second power relates to the instantaneous amplitudes and directions of the energy flows and takes place in the common DC link circuit which is intended to remain virtually as no load as a result of this. The control unit is configured, according to the disclosure, to control the bridge arms in such a manner that the geometrical sum of the second power, which flows through the third bridge arm, and the first power, which flows through the first and second bridge arms, results at any time, in the common DC link circuit, in a constant set point power which is drawn from the DC source and is output as alternating current at the phase outputs. Overall, minor fluctuations in the sum of the instantaneous values are intended to be compensated for at least over the duration of a grid period.

This means that an instantaneous value of a power flowing into or out of the energy store compensates for the AC voltage power on a time scale which relates to the grid frequency.

A method according to the disclosure relates to a control of a converter, to the input of which a DC source can be connected. The converter comprises at least one transducer module with a first, a second and a third bridge arm, wherein each of the bridge arms respectively has a phase output, and a common DC link circuit for the bridge arms. The converter also comprises a control unit for controlling the bridge arms or their semiconductor switches, and an energy store can be connected to the third bridge arm. According to the disclosure, the first and second bridge arms are controlled in such a manner that a first power is drawn from the DC source and is provided as alternating current at the phase outputs. In other words, an AC power can be fed into a grid or AC loads can be supplied with electrical power. The third bridge arm is controlled in such a manner that a second power can be exchanged between the DC source and the energy store and between the energy store and the common DC link circuit.

In one embodiment, in the control of the bridge arms, the sum of the first power and the second power corresponds to a constant set point, with the result that a power flow into or out of the common DC link circuit is minimized. In other words, the third bridge arm is controlled in such a manner that an instantaneous value of the power flowing into or out of the energy store compensates for the generated AC voltage power on a time scale which relates to the grid frequency. For this purpose, in one embodiment, the power flowing into or out of the energy store and the AC voltage power run in phase opposition.

In this manner, the AC voltage power is compensated for, over the course of each grid frequency period, by the varying power which flows into or out of the energy store in such a manner that the DC source has a constant load. In this manner, the energy store can at least partially undertake the function of capacitors which, in devices according to the prior art, are usually arranged in the DC link circuit. As a result of the method according to the disclosure, these capacitors do not need to intercept the power fluctuations in the AC power which occur at twice the grid frequency, but rather only the current ripple which occurs at a very much higher frequency and is caused by the switching of the semiconductor switches. Accordingly, a capacitance in the DC link circuit can be kept low, in particular so low that it can be afforded economically and with regard to the lower space requirement by film capacitors which have a longer service life and lower losses than electrolytic capacitors, for example.

In one embodiment, the constant set point corresponds to a maximum power point (MPP) of the DC source, for example, a PV generator. This is advantageous for the maximum energy yield of the DC source and results in optimized efficiency of the overall system comprising the DC source and the converter.

In a further embodiment of the converter, the first, second and third bridge arms are of the same design. This provides the advantage of using "standard three-phase inverters", which can be produced favorably and in a large quantity, for applications combined with energy stores, for example batteries, which has hitherto not been possible. Furthermore, the bridge arms are, in one embodiment, configured for a bidirectional method of operation in order to also allow a current to flow back from the energy store into the DC link circuit, if necessary, which brings the additional advantage of being able to connect the energy store to any desired bridge arm. It is therefore also possible to provide reactive current, for example for grid support, on the other bridge arms.

In another embodiment, the converter according to the disclosure comprises precisely one transducer module with three bridge arms, thus enabling a single-phase alternating current at the phase outputs of two of the three bridge arms, for example for directly supplying local loads or for feeding into an island grid or a superordinate integrated grid. Nevertheless, this function can be provided using a "standard three-phase inverter", the DC link circuit of which is constructed with favorable and space-saving film capacitors, for example. The link circuit capacitance missing in comparison with conventional inverters for single-phase applications is achieved, according to the disclosure, by the power consumption and power output to the link circuit from the storage unit via the control of the third bridge arm.

In one embodiment, the converter according to the disclosure can also advantageously comprise at least three transducer modules with three bridge arms each. In such instance, a three-phase AC voltage is provided on the output side and each phase of the three-phase AC voltage is provided by two bridge arms of different transducer modules, and wherein the third bridge arms can be coupled to an energy store. These may each be an energy store on one of the third bridge arms of the three transducer modules, that is to say a total of three energy stores. Alternatively, all third bridge arms of the three transducer modules can be connected to a common energy store.

Converters having at least three (structurally identical) transducer modules with three bridge arms each are customary on the market, wherein the transducer modules are usually operated in a parallel manner in order to be able to provide higher powers.

In one advantageous configuration of the converter, the energy store comprises a (rechargeable) battery, also called a storage battery. A phase output of the third bridge arm or the phase outputs of the third bridge arms can also form part of the energy store.

The described method can be particularly advantageously used in a converter which is used to feed AC power into a single-phase energy supply grid for rail transport. This applies, in particular, since lower grid frequencies are often used in rail transport, for example approximately 16 Hz (hertz) instead of 50 or 60 Hz in other energy supply grids. The lower the grid frequency, the higher the capacitances which must be used for converters according to the prior art in the DC link circuit if the PV generator is intended to be loaded as uniformly as possible over the course of a grid period. The method according to the disclosure makes it possible to also feed higher power into an only single-phase energy supply grid with a reasonable outlay on components for the DC link circuit since the link circuit capacitance missing in the "standard three-phase inverter" with film capacitors is "emulated", for example, by the battery.

BRIEF DESCRIPTION OF THE DRAWINGS

The disclosure is explained in more detail below on the basis of exemplary embodiments with the aid of figures, in which.

DETAILED DESCRIPTION

Figure 1:
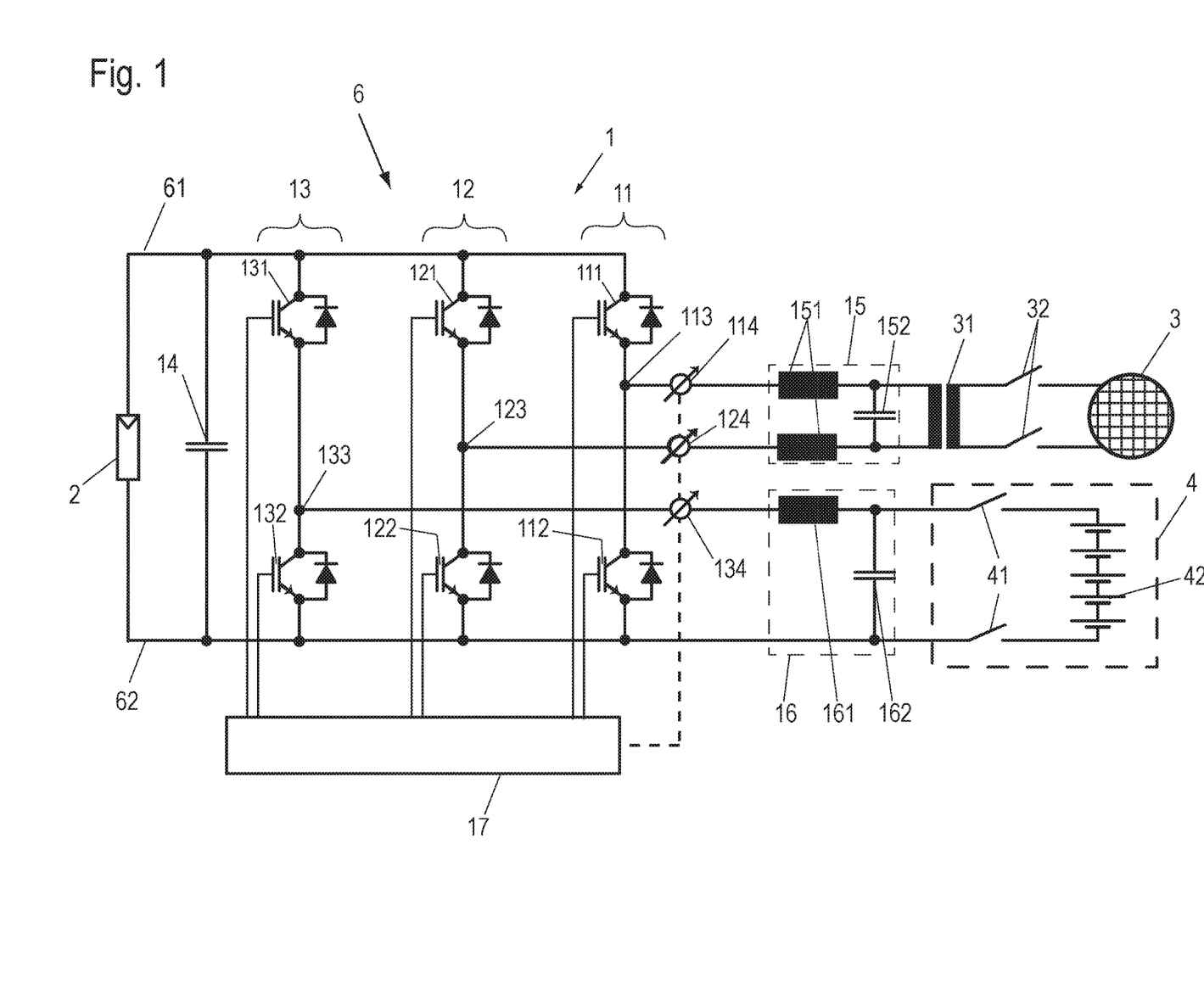
FIG. 1 shows a schematic illustration of an arrangement having a converter in a first example embodiment.

FIG. 1 represents, in a schematic circuit diagram, an arrangement having a converter 6 in a first exemplary embodiment.

The converter 6 has a transducer module 1 with three bridge arms, a first bridge arm 11, a second bridge arm 12 and a third bridge arm 13. Each of these bridge arms 11-13 comprises two semiconductor switches 111, 112 and 121, 122 and 131, 132 connected in series. At the inputs 61, 62 of the converter 6, a DC input voltage is supplied to the bridge arms 11-13, which voltage is provided here, by way of example, by a photovoltaic (PV) generator 2. Center taps between the respective two semiconductor switches 111, 112 and 121, 122 and 131, 132 of each bridge arm 11-13 constitute phase outputs 113, 123, 133 of the bridge arms 11-13 in the topology shown.

The PV generator 2 is symbolically represented by the circuit symbol of a single PV cell in FIG. 1. It goes without saying that the PV generator 2 may comprise a multiplicity of PV cells arranged in a plurality of PV modules, wherein the PV modules in turn can be connected in a series and/or parallel circuit in order to form the PV generator 2.

A DC link circuit 14 which is symbolized by the circuit symbol of a capacitor in FIG. 1 is formed in parallel with the PV generator 2 as part of the transducer module 1.

The individual semiconductor switches 111, 112, 121, 122, 131, 132 are controlled by a control unit 17, for example, in a pulse width modulation method (PWM method) in order to convert the supplied direct current. In the example shown, the semiconductor switches 111, 112, 121, 122, 131, 132 are IGBTs (insulated gate bipolar transistors) with freewheeling diodes which are reverse-connected in parallel. The control of the semiconductor switches 111, 112, 121, 122, 131, 132 is shown schematically in FIG. 1.

In order to correctly determine the switching times of the PWM method, suitable current and/or voltage measured values are required on the bridge arms 11-13 and/or at outputs of the converter 6. By way of example, current measuring means 114, 124 and 134 for measuring an output current of each bridge arm 11-13 are illustrated in FIG. 1. These may be, for example, shunts or sensors such as Hall sensors which determine a current on the basis of a measured magnetic field. The measured current values are evaluated in the control unit 17. For reasons of clarity, corresponding voltage measuring means for measuring an output voltage at the phase outputs 113, 123 and 133 have not been depicted in FIG. 1.

In the converter 6 illustrated by way of example, the center taps constitute the phase outputs 113, 123, 133 of the converter 6. In principle, topologies other than the shown so-called B6 topology with three bridge arms each with two semiconductor switches and a center tap may also be implemented in the converter 6. It would also be possible to use a converter having a three-level or multi-level topology such as "neutral point clamped" (NPC), "bipolar switch neutral point clamped" (BSNPC), "active neutral point clamped" (ANPC) or "flying capacitor" (FLC). These topologies possibly require more semiconductor switches per bridge arm than the B6 topology, but often afford advantages in terms of their efficiency.

The converter 6 with its three bridge arms 11-13 is fundamentally suitable for converting the direct current supplied at the input into a three-phase alternating current. Since this is a frequently occurring intended purpose of converters, converters having three bridge arms are common on the market. The three bridge arms generally have an identical structure and each have an identical current and voltage load capacity.

In the application illustrated in FIG. 1, only two of the bridge arms, here the first bridge arm 11 and the second bridge arm 12, are used in the form of an H-bridge to convert the supplied input direct current into a single-phase alternating current. For this purpose, the phase outputs 113, 123 of the two bridge arms 11, 12 are coupled to a phase of an energy supply grid 3 via a filter 15. The two bridge arms 11, 12 can therefore be considered to be part of an AC arm of the converter 6.

In the present embodiment, a transformer 31 is provided for coupling to the energy supply grid 3. By way of example, switching elements 32 are also present as grid disconnectors. In addition, safety or measuring devices which are not shown here can be arranged between the converter 6 and the energy supply grid 3.

The filter 15 comprises two inductors (coils) 151 arranged in series in the lines between the phase outputs 113, 123 and the energy supply grid 3 and a capacitor 152 arranged in parallel with a primary winding of the transformer 31. The filter 15 acts as a so-called sine-wave filter and is used to smooth the single-phase alternating current produced. It goes without saying that other combinations of inductors and capacitors could be used as the filter 15.

In the present embodiment, the third bridge arm 13 is not provided for inversion, but rather is connected to a DC unit 4. The coupling is effected via a filter 16 which likewise comprises an inductor (coil) 161 connected in series and a capacitor 162 connected in parallel with the DC unit 4. The bridge arm 13 can therefore be considered to be part of a DC arm of the converter 6.

In this embodiment, the components of the filter 16, together with the semiconductor switches 131, 132 of the third bridge arm 13, act as a DC/DC converter with a step-up and/or step-down function.

In this embodiment, the terms "DC unit" and "DC/DC converter" should not be understood as meaning that current and power flow only in one direction. On the contrary, a converter according to the application and a method according to the application are distinguished precisely by the fact that the current intensity or polarity of a current flow into or out of the DC unit 4 can vary on a time scale which is of the order of magnitude of the period duration of the alternating current frequency in the energy supply grid 3.

In the present embodiment, the DC unit 4 comprises switching elements 41 for coupling or uncoupling a battery 42. The battery 42 is a rechargeable battery which is represented here, by way of example, by a plurality of battery cells connected in series. Suitable control of the semiconductor switches 131, 132 achieves a current flow from the PV generator 2 or from the DC link circuit 14 into the battery 42 or conversely from the battery 42 into the DC link circuit 14.

According to the application, the battery 42 constitutes an energy store for supporting or relieving the load on the DC link circuit 14. It is noted that the components of the filter 16 also have an energy-storing function and therefore form part of the energy store alongside the battery 42.

The coupling of the converter 6 to the energy supply grid 3 is also referred to as an AC arm below and the coupling of the converter 6 to the DC unit 4 and, in particular, to the energy store is referred to as a DC arm.

The arrangement illustrated in FIG. 1 makes it possible to feed alternating current provided by the PV generator 2 into the single-phase energy supply grid 3.

A field of application of the arrangement according to FIG. 1 is feeding the current generated by the PV generator 2 into a single-phase superordinate energy supply grid 3. Such a single-phase superordinate energy supply grid 3 is present, for example, when supplying railroad lines in rail transport, with the result that the arrangement illustrated according to FIG. 1 can be used, for example, in conjunction with a free-field PV installation along a railroad line.

In an operating method according to the application for a converter having three bridge arms, for example the converter 6 shown in FIG. 1, the power transmitted by the converter via the DC arm is set on the basis of the transmitted AC power. The power instantaneously varying over the course of an AC period for the alternating current is therefore also reflected in the transmitted power in the DC arm. The AC power varies twice between a minimum value and a maximum value within a period of the alternating current. The power transmitted in the DC arm accordingly also varies at twice the frequency of the alternating current, but accordingly in phase opposition.

Figure 2:
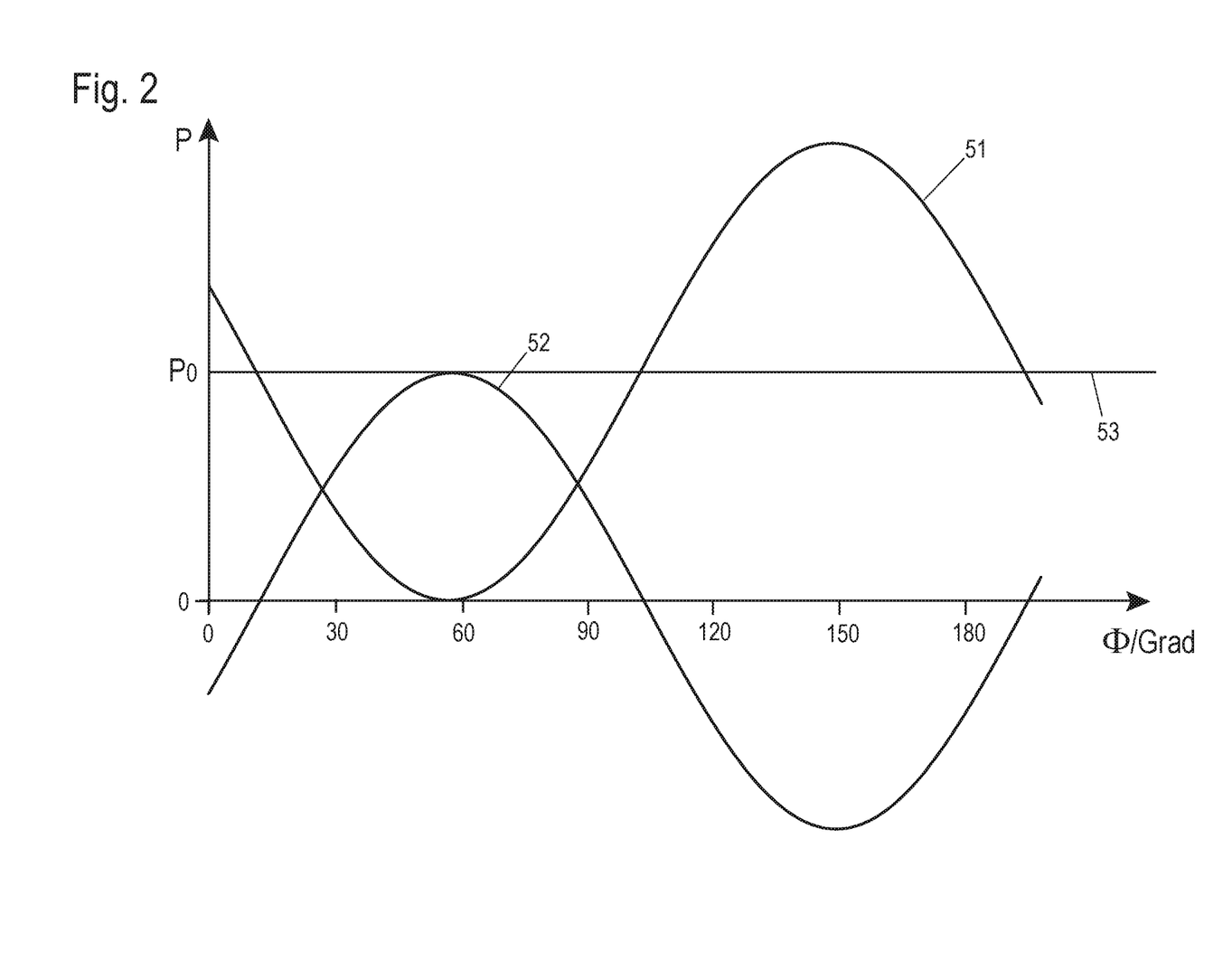
FIG. 2 shows a schematic graph of the power distribution during half an AC period in the arrangement of the first example embodiment.

This is schematically illustrated in a graph in FIG. 2 in which the profile of power P, which is transmitted in the AC or DC arm of a converter, is illustrated on the basis of a phase angle $\phi$ of the output alternating current. The power P is indicated on the vertical axis of the graph and the phase angle $\phi$ is indicated on the horizontal axis of the graph. By way of example, FIG. 2 is explained below with reference to the structure of the converter 6 according to FIG. 1.

Three curve profiles are depicted in the graph, namely an instantaneous first power 51 transmitted over the course of the illustrated half period of the alternating current in the AC arm, also called AC power 51 below (corresponds to the power of one phase of a three-phase grid), a second power 52 which is currently being transmitted into (in the case of a positive value) or out of (in the case of a negative value) the battery 42 in the DC arm. This power 52 transmitted in the DC arm is also referred to as storage power 52 below. Furthermore, a third power 53 is illustrated and corresponds to the average power 53 drawn from the PV generator 2. The illustrated curve profiles represent the transmitted power. If any losses in the converter 6 are disregarded, the curve profiles also represent in the same manner the power received by the respective AC or DC arm and the power drawn from the DC link circuit 14.

The AC power 51 shows a typical sine-squared-like profile. According to the application, the switching elements 131, 132 of the third bridge arm 13, which is part of the DC/DC converter, are controlled in such a manner that the transmitted storage power 52 runs in phase opposition with respect to the transmitted AC power 51, with the result that the power transmitted overall and therefore also the power 53 provided by the PV generator 2 is constant.

The DC link circuit 14 is therefore loaded uniformly over a period of the output AC voltage, as a result of which voltage dips are avoided and the PV generator 2 is always operated at the MPP (maximum power point). This is achieved by varying the power fed into the battery 42 or drawn from the battery 42 during the illustrated half period duration of the generated alternating current in such a manner that the sum of the AC power 51 and the storage power 52 is constant.

In this case, power can also be occasionally drawn from the battery 42, in the range between 105° and 195° of the phase angle $\phi$ in the illustrated example, which power then flows into the AC arm. Energy is accordingly transmitted from the battery 42 back into the DC link circuit 14. In this case, the DC arm of the converter 6 supports the DC link circuit 14.

This procedure is useful, in particular, when the converter 5 according to FIG. 1 is used to supply a railroad energy supply grid 3 since this is often operated at a low frequency, for example 16.6 Hz, and the DC link circuit 14 of a converter, which is actually dimensioned for three-phase conversion at a higher frequency of 50 or 60 Hz, therefore often does not have a sufficient capacitance. A suitably dimensioned capacitor in the DC link circuit 14 would have a very large volume and would be cost-intensive. As a result of the method according to the application, the capacitance in the DC link circuit 14 can be kept so low that it can be afforded economically and with regard to the space requirement by film capacitors which have a longer service life and lower losses than electrolytic capacitors, for example.

FIG. 2 illustrates a situation in which the transmitted AC power is pure active power. However, it is also possible to exchange reactive power, in addition to active power, with an energy supply grid by means of the converter. The phase angle of the direct current transmitted by the DC/DC converter is oriented in that case to the phase angle of the overall current which is transmitted in the AC arm.

In one development of the converter, the latter may comprise a plurality of transducer modules each with three bridge arms. Two bridge arms of each transducer module can then be respectively used in the AC arm and one can be used in the DC arm. The AC arm can provide alternating current on a total of one or more, for example three, AC voltage phases, wherein the two bridge arms assigned to one phase need not necessarily be assigned to one transducer module.

Figure 3:
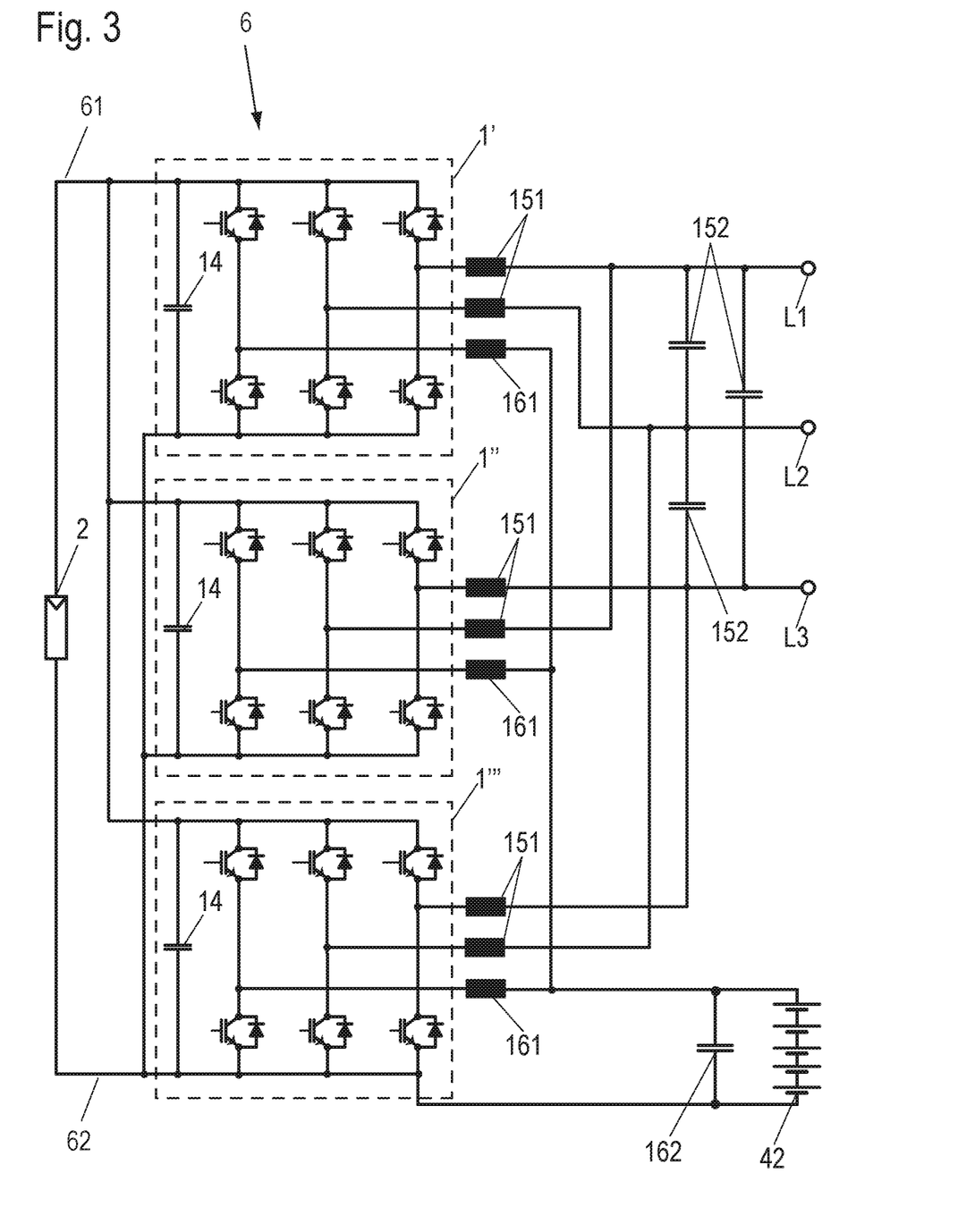
FIG. 3 shows a schematic illustration of an arrangement having a converter in a second example embodiment.

FIG. 3 shows such a converter 6 comprising three three-phase transducer modules 1', 1" and 1''' which are connected, on the input side, to a common PV generator 2. Arrangements of three (structurally identical) three-phase transducer modules are conventional on the market in converters in order to be able to provide higher powers and to be able to resort to devices which have already been developed. In the example in FIG. 3, identical reference signs denote identical or identically acting elements as in FIG. 1. For the sake of clarity, not all elements in FIG. 3 are provided with a reference sign. Some elements, for example a control unit (cf. reference sign 17 in FIG. 1) have also not been illustrated. The control unit can comprise three control units communicating with one another, very similar to that shown in FIG. 1 for a converter having one transducer module, or a common control unit for all transducer modules can provide the control signals for all included semiconductor switches.

In a similar manner to the transducer module 1 in FIG. 1, the individual transducer modules 1', 1", 1''' are constructed with three bridge arms each. Three bridge arms—in each case one of each of the transducer modules 1', 1", 1'''—are connected to a common capacitor 162 via inductors 161 and are coupled to a battery 42. The respective other two bridge arms of the transducer modules 1', 1", 1''' are connected, via inductors 151 and capacitors 152, to three phase outputs L1, L2 and L3, at which a three-phase alternating current for feeding into a three-phase energy supply grid is provided.

However, unlike in the example embodiment in FIG. 1, a different connection of the bridge arms to the phases L1, L2 and L3 is selected here and can be described as "crossed". Two bridge arms of different transducer modules respectively supply one phase. In FIG. 3, a bridge arm of the transducer module 1' and a bridge arm of the transducer module 1" thus generate the alternating current for phase L1. This reduces the need for compensation between the output AC power and the power to be provided by the DC arm.

Figure 4:
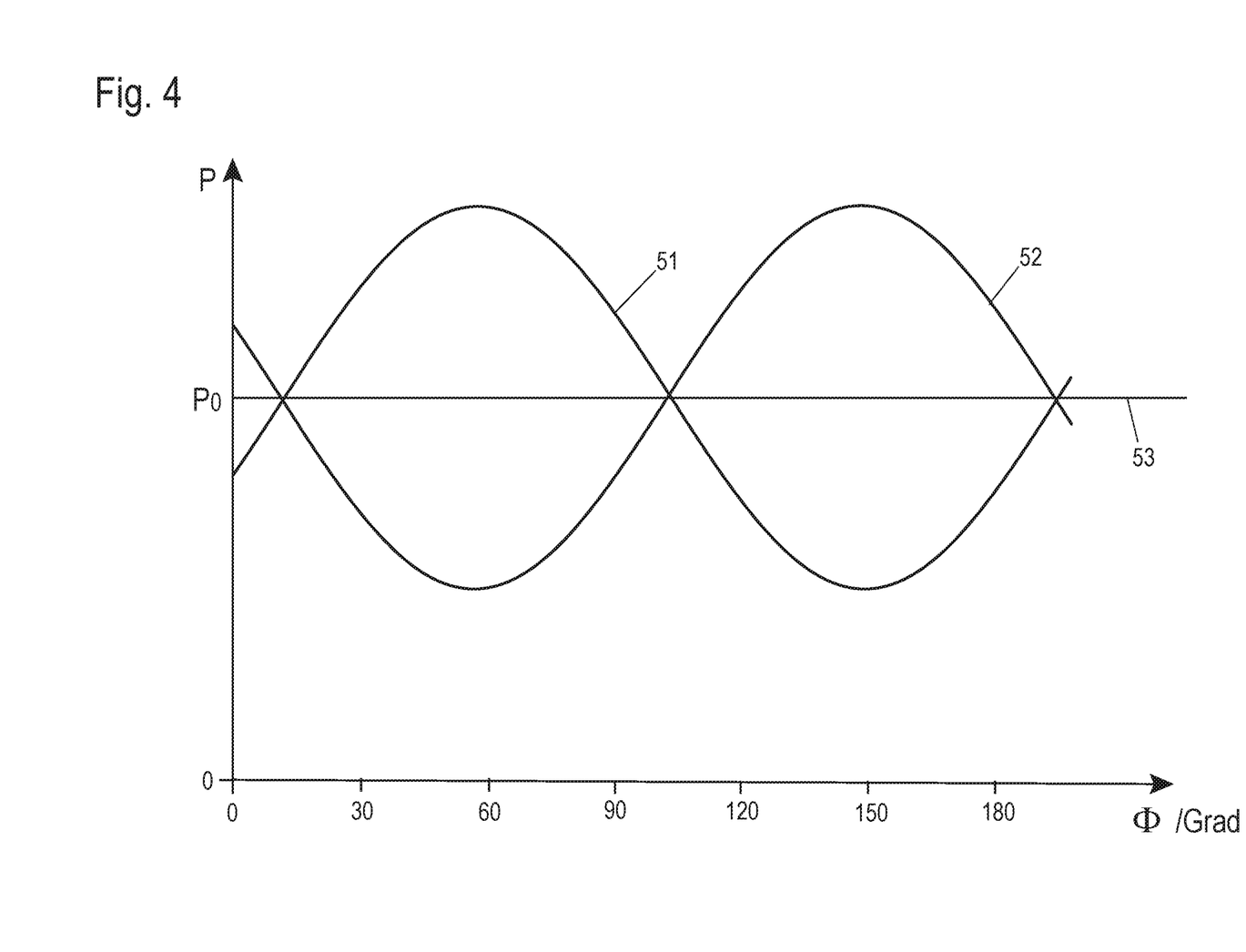
FIG. 4 shows a schematic graph of the power distribution during half an AC period in the arrangement of the second example embodiment.

FIG. 4 shows operation according to the disclosure of the arrangement in FIG. 3 in a graph similar to FIG. 2. One of the illustrated curves again shows the AC power 51 fed into the energy supply grid, one curve shows the storage power 52 flowing into the battery 42 and one curve shows the PV power 53 drawn from the PV generator. During pure three-phase operation, the AC power 52 is a DC power which has a sinusoidal power component with half the amplitude of the DC power and twice the grid frequency superimposed on it.

According to the disclosure, the bridge arms connected to the battery 42 are now controlled in such a manner that the storage power 52 runs in phase opposition with respect to the AC power, as a result of which the PV power 53 drawn from the PV generator 2 is constant. In a similar manner to the first example embodiment, power is advantageously output by the PV generator as uniformly as possible in each grid period, that is to say, on a time scale of the grid period.

The current into the battery 42 is a direct current since the individual currents of the three bridge arms are controlled in a manner offset through 60° in each case with respect to their sinusoidal component (based on the grid fundamental frequency).

The invention claimed is:

1. A converter, comprising:
   an input configured to be connected to a DC source,
   at least one transducer module coupled to the input, and comprising a first, a second and a third bridge arm, wherein the first, second and third bridge arms have a first, second and third phase output, respectively,
   a common DC link circuit coupled to the input and the first, second and third bridge arms,
   wherein the first and second phase outputs are each configured to be coupled to an AC grid,
   wherein the first and second bridge arms are configured to provide a first power in the form of alternating current at their respective first and second phase outputs for transfer to the AC grid when coupled thereto,
   wherein the third phase output of the third bridge arm is configured to be connected to an energy store and not to the AC grid, and the third bridge arm is configured to exchange a second power between the DC source and the energy store and between the energy store and the common DC link circuit, and wherein the third phase output of the third bridge arm does not exchange power between the DC source and the AC grid when the converter is coupled thereto, and
   a control unit configured to control the first, second and third bridge arms in such a manner that a sum of the first power and the second power corresponds to a constant set point.

2. The converter as claimed in claim 1, wherein the constant set point corresponds to a maximum power point (MPP) of the DC source.

3. The converter as claimed in claim 1, wherein the first, second and third bridge arms comprise the same design.

4. The converter as claimed in claim 1, wherein the first, second and third bridge arms are configured for a bidirectional method of operation.

5. The converter as claimed in claim 1, wherein the converter comprises precisely one transducer module with three bridge arms.

6. The converter as claimed in claim 1, wherein the converter comprises at least three transducer modules that each comprise first, second and third bridge arms, wherein a three-phase AC voltage is provided on an output side and each phase of the three-phase AC voltage is provided by two bridge arms of different transducer modules, wherein the third bridge arms of each transducer are coupled to a respective energy store.

7. The converter as claimed in claim 1, further comprising a filter connected between the energy store and the third phase output.

8. The converter as claimed in claim 1, wherein the DC link circuit comprises film capacitors.

9. The converter as claimed in claim 1, wherein the first, second and third bridge arms comprise a neutral point clamped (NPC) arrangement, a bipolar switch neutral point clamped (BSNPC) arrangement, an active neutral point clamped (ANPC) arrangement, or a flying capacitor (FLC) arms arrangement.

10. The converter of claim 1, wherein the third bridge arm is part of a DC arm of the converter.

11. A method for operating a converter comprising an input, connectable to a DC source, and at least one transducer module with a first, a second and a third bridge arm, wherein the first, second and third bridge arms have a first, second and third phase output, respectively, a common DC link circuit for the first, second and third bridge arms, wherein the first and second phase outputs are configured to be connected to an AC grid when the converter is coupled thereto, and wherein the third phase output is configured to be connected to an energy store and not connected to the AC grid when the converter is coupled thereto, the converter also comprising a control circuit configured to control the first, second and third bridge arms, the method comprising:
   controlling the first and second bridge arms using the control circuit in such a manner that a first power is provided in the form of alternating current at the first and second phase outputs to the AC grid when coupled thereto,
   controlling the third bridge arm using the control circuit in such a manner that a second power is exchanged at the third phase output between the DC source and the energy store and between the energy store and the DC link circuit, and wherein the third bridge arm does not exchange power between the DC source and the AC grid; and
   maintaining the sum of the first power and the second power during the controlling of the first, second and third bridge arms at a constant set point.

12. The method as claimed in claim 11, wherein the constant set point corresponds to a maximum power point (MPP) of the DC source.

13. The method as claimed in claim 11, wherein the second power flowing into or out of the energy store and the first power run in phase opposition relative to one another, such that the DC source has a constant load.

14. The method as claimed in claim 11, wherein the first power is fed into a single-phase energy supply grid for rail transport.

15. The method as claimed in claim 11, wherein the third bridge arm together with components of a filter operate as a DC-DC converter.

* * * * *